United States Patent
Ma (10) Patent No.: US 7,095,466 B2
(45) Date of Patent: Aug. 22, 2006

(54) DIFFUSIVELY REFLECTIVE CIRCULAR POLARIZER FORMED BY THERMO PHASE SEPARATION

(76) Inventor: Yao-Dong Ma, 14586 Pensham Dr., Frisco, TX (US) 75035

( * ) Notice: Subject to any disclaimer, the term of this patent is extended or adjusted under 35 U.S.C. 154(b) by 352 days.

(21) Appl. No.: 10/657,676

(22) Filed: Sep. 8, 2003

(65) Prior Publication Data

US 2005/0052595 A1    Mar. 10, 2005

(51) Int. Cl.
*G02F 1/335* (2006.01)
*G02F 1/13* (2006.01)

(52) U.S. Cl. .................. 349/115; 349/176; 349/112

(58) Field of Classification Search ........... 349/115, 349/112, 176, 187
See application file for complete search history.

(56) References Cited

U.S. PATENT DOCUMENTS 5,437,811 A * 8/1995 Doane et al. .......... 252/299.01
5,796,454 A * 8/1998 Ma ........................... 349/98
6,462,805 B1 * 10/2002 Wu et al. ................. 349/169
6,757,039 B1 * 6/2004 Ma ........................... 349/115
6,873,393 B1 * 3/2005 Ma ........................... 349/176

* cited by examiner

*Primary Examiner*—Toan Ton (57) ABSTRACT

The present invention relates to a circular polarizer, more specifically, to a diffusively reflective circular polarizer (DRCP), which is characterized by broadband reflection and transmission over a hemispheric viewing angle. A thermo phase separation process of a cholesteric liquid crystal polymer system creates the DRCP film. As a multi-functional optical material, the DRCP film combines the merits of polarizer, reflector and diffuser to form an all-in-one component in the electro-optical industry. Moreover, since the novel film has a "silver white" appearance and super "hiding power", it will initiate many other applications.

18 Claims, 5 Drawing Sheets

(5 of 5 Drawing Sheet(s) Filed in Color)

DIFFUSIVELY REFLECTIVE CIRCULAR POLARIZER FORMED BY THERMO PHASE SEPARATION

FIELD OF INVENTION

The present invention relates to a circular polarizer, more specifically, to a diffusively reflective circular polarizer (DRCP), which is characterized by broadband reflection and transmission over a hemispheric viewing angle. A thermo phase separation process of a cholesteric liquid crystal polymer system creates the DRCP film. As a multi-functional optical material, the DRCP combines the merits of polarizer, reflector and diffuser to form an all-in-one component in the electro-optical industry. Moreover, since the novel film has a "silver white" appearance and super "hiding power", it will initiate many other applications.

BACKGROUND OF THE INVENTION

Cholesteric liquid crystal polymer (CLCP) film is characterized by the fact that it selectively reflects the incoming light and turns out a narrow band circular polarization to the front viewer. The CLCP film is utilizing "Bragg reflection", one of the intrinsic properties of cholesterics. In Bragg reflection, only a portion of the incident light with the same handedness of circular polarization and also within the specific wave band can reflect back to the viewer. The remaining spectra of the incoming light, however, including the 50% opposite-handed circular polarization and the same-handed out-off Bragg reflection wave band, will pass through the film. Theoretically, the reflective component is narrow band circular polarization while the transmissive one is broadband elliptical polarization.

A broadband reflection can be also realized by means of changing the helical structure of the CLCP film.

The cholesteric broadband polarizer (BBP) was first disclosed, to the knowledge of the applicant, in the article "Cholesteric Color Filter Made From Cholesteric LC Silicones", published May 15, 1990 (SID 90 Digest. 111). The paper describes experiments concerning the construction of broadband polarizer by combining layers of cholesteric LC-silicones of different reflection wavelength. Five LC-silicon layers were stacked together and the circular polarization was observed from 430 nm to 670 nm. The ellipticity spectra for the combined layers were also calculated from the spectra of each single layer. The good agreement with the observed spectra clearly demonstrates the conservation of circular polarization by transmitting light through cholesteric layers. For that reason it is possible to arrange LC-layers with different Bragg reflection wavelengths to get broadband filters without loss of circular polarization.

The European Patent Application 94200026.6 with the title of "Cholesteric Polarizer and Manufacture Thereof", published Jul. 20, 1994 and assigned to Philips Electronics, N.V. of Eindhoven, Netherlands (the "Philips reference") introduces a method to make a single layer CLCP film having broadband reflection and transmission characteristics. The Philips disclosure requires adding a UV dye into CLCP mixture so that the pitch of the CLCP material changes linearly from its maximum value at one film surface to its minimum value at the other film surface. The CLCP material is formed from two polymerizable chiral and nematic monomers, each of which has a different reactivity. During polymerization of the mixture by means of UV exposure, a linear variation in UV light intensity is to be preferentially incorporated into the least reactive monomer to occur at the location of the highest radiation intensity. As a result, at least one concentration gradient of free monomers is formed during polymerization, causing the monomer to diffuse from locations with a low monomer concentration to the location with a high concentration. The monomers of high reactivity diffuse to the locations where the radiation intensity is the highest. As a result, the composition of the material varies in a direction transverse to the surfaces of the film such that a linear variation in the pitch of the molecular helices results in the layer formed by the polymer. The liquid crystal material is distributed linearly across the thickness of the film. This variation in pitch provides the optically active layer with a bandwidth proportional to the variation in the pitch of the molecular helices.

An article "From Selective to Wide-band Light Reflection: a Simple Thermal diffusion in a Glassy Cholesteric Liquid Crystal", published Dec. 17, 1998, Physical Journal B, France, introduces a method to fabricate a wide-band circular polarizer. The method relates to a spontaneous diffusion of monomers into a polymerizable CLCP film and then following a UV polymerization. The fabrication is carried out by depositing a film of reactive monomers on the surface of a polymerized film of CLCP material. The diffusion of monomers into the CLCP film layer causes a concentration gradient in the layer before diffusion is halted. As a result, the original CLCP material swells slightly causing an increase in pitch of the molecular helices. This provides a concentration gradient which, in turn, results in a "linear variation" in pitch across the film thickness. Polymerization of the layer by UV light exposure halts diffusion providing a broadband polarizer.

U.S. Pat. No. 6,532,049 with the title of "Circularly Polarizing Reflective Material Having Super Broad-band Reflection and Transmission Characteristics and Method of Fabricating and Using Same in Diverse Applications" published Mar. 11, 2003 and assigned to Reveo, Inc. of Elmsford N.Y. (the "Reveo reference"), introduces a method for fabricating a broadband circularly polarizing material. According to the method, a CLCP material is mixed with non-cross linkable liquid crystal material, a photoinitiator and a chiral additive at a temperature, which maintains the mixture in a liquid crystal state. While being heated, the mixture is subjected to UV light radiation for a time and at an intensity sufficient to polymerize the CLCP material or the liquid crystal material or the both. Such polymerization occurs in a non-linear fashion, thereby resulting in a non-linear distribution of the polymer and the liquid crystal material across the film. During polymerization, phase separation takes place. The segregation rate of the liquid crystal material is designed to be greater than the polymerization rate of the CLCP material being polymerized. Thus, the liquid crystal material segregates and diffuses to sites of enlarged pitch in the CLCP material from sites of shrunken pitch in the CLCP material. Consequently, an exponentially distributed pitch is generated from one surface to the other of the CLCP film.

In the above-mentioned prior art, all the broadband polarizers reported are one-dimensional optical system wherein the gradient of the helical pitch variation occurs only in the depth dimension (i.e. transverse to the surface of the substrates) whether is in a linear fashion or in a non-linear fashion. All those prior art products take on a mirror appearance; no wander people often call them "dichroic mirror". The specula reflection of the traditional BBP film greatly limits itself in many applications because of its strong angular dependence. A separate diffuser layer is usually combined with it in order to enlarge the viewing angle. The other shortcoming of the prior art is that the narrow band circular polarizer and the broadband circular polarizer are not inter-convertible. Once the broadband polarizer is produced, the material will never convert back to the narrow band material.

SUMMARY OF THE INVENTION

It is the primary objective of the present invention to provide a diffusively reflective circular polarizer film which has hemispheric viewing angle and bright reflection over a wide visible bandwidth.

It is another objective of the present invention to provide a cholesteric microchip structure which has three-dimensional helical pitch variation.

It is still another objective of the present invention to provide a fabrication method of thermo phase separation to convert the CLCP film from narrow band planar structure into broadband microchip structure.

It is also another objective of the present invention to provide a fabrication method of phase unification to convert the CLCP film from broadband microchip structure into narrow band planar structure.

It is still another objective of the present invention to provide a thermoplastic polymeric broadband polarizer, which is erasable, re-writable, patternable and laser addressable from broadband to narrow band and vice versa.

It is another objective of the present invention to provide a UV curable thermoset polymeric broadband polarizer, which is high-temperature stable after the broadband microchip structure, being formed by the phase separation, is cured by a UV light initiated polymerization.

It is a further objective of the present invention to provide a single film of CLCP material in which the helical pitch of microchips is varied in three-dimensional distribution through out the CLCP film.

It is another objective of the present invention to provide a silver white or paper white bright painting material which is capable of reflecting ultra violet, visible and infrared wavelengths over a large reflection angle.

It is, once more, another objective of the present invention to provide a cost effective, continuous process for the mass production of the diffusively reflective broadband polarizer film.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
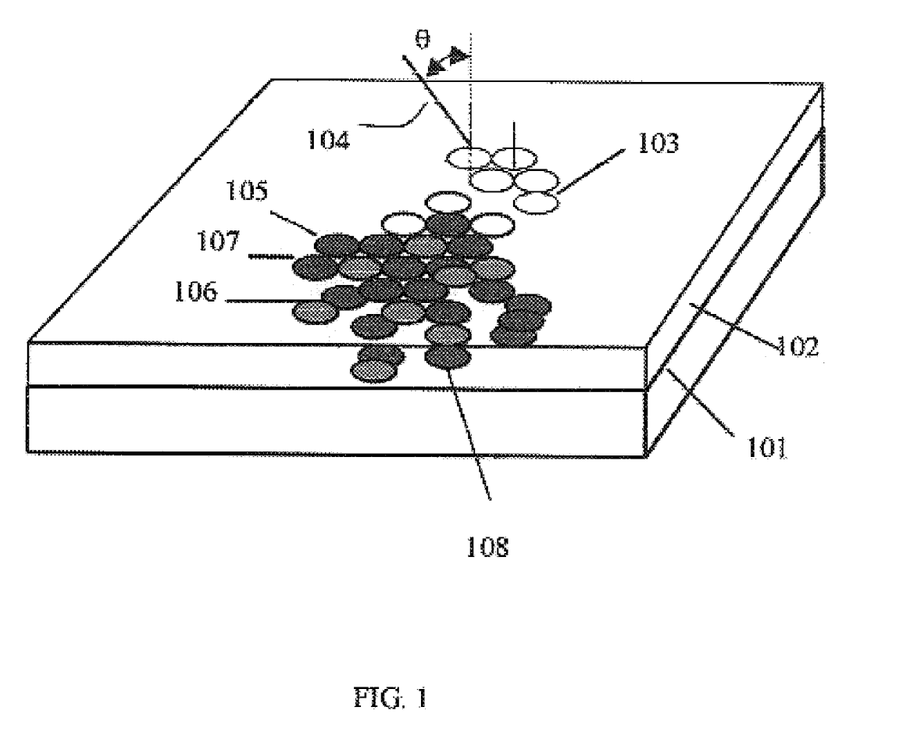
FIG. 1 demonstrates a schematic microchip structure of a diffusively reflective circular polarizer.

Referring first to FIG. 1, illustrated is a schematic structure of the diffusively reflective circular polarizer. A supporting layer 101 can be made of a glass or a plastic substrate with the thickness in the range of 0.1~1.1 mm. The substrate can be worked as an alignment layer because it provides a planar alignment to the cholesteric molecules besides its physical flatness and stiffness. A cholesteric polymer layer 102 is positioned on the top of the supporting layer 101. In the present invention, the cholesteric layer is a single coating layer of a cholesteric polymer with the thickness in the range of 4~40 µm, more preferably, 20~25 µm. After the phase separation is done, the cholesteric coating 102 appears silver white over a very large viewing angle, which is a functional layer of the diffusively reflective circular polarizer. In order to make the cholesteric coating self-supportable, 102 needs to attach onto the substrate 101 so as to form a complete structure of the polarizer film. The microchip 103, with the average diameter 20 µm, is a basic unit of the polarizer. Each microchip has a specific helical pitch. The microstructure 105, 106 and 107 represent red, green and blue primary color chips respectively, distributing in the media of the coating layer. As a matter of fact, the R, G and B color of the chips are coming from the observation under microscope and not from the instrumental measurement. The microchips with different colors are dispersed uniformly and randomly in a two or three-dimensional manor. The bright white microstructure 108 is consisting at least two microchips, which are stacked together with different helical pitches.

The above-mentioned microchip model is depicted through the microscopic observation of the present invention.

There are two meanings of the multi-dimensional randomness of the structure. First, the symmetry axis 104 of an individual microchip is two-dimensional distributed along the X-Y plane, a normal distribution with the maximum reflection parallel to the Z direction. The "θ" is the angle between the symmetry axis of the microchip and the normal direction of the film, which normally in the range of 0~45 degree. The random orientation of the helical axes of the microchips attributes to the diffusive reflection. Secondly, the helical pitch "p" of the cholesteric polymer is three-dimensional distributed, because each individual microchip has its own helical pitch that governs the reflective color via the Bragg reflection. This can be explained by the following expression:

$$\lambda_i = n\, p_i$$

where $\lambda_i$ represents the central wavelength of a microchip, n is the average index of the CLCP material and $p_i$ is the helical pitch of the microchip. Similarly, the wave band of an individual microchip can be expressed by the following equation:

$$\Delta\lambda_i = \Delta n\, p_i$$

where $\Delta\lambda_i$ represents the wave band of a microchip, $\Delta n$ is the optical anisotropy of the CLCP material. After the thermo phase separation process, here comes a lot of microchips, with different helical pitches, and therefore different colors, which are mixing along both the X-Y plane (horizontal) and Z (vertical) direction. The resulting wave band, $\Delta\lambda$, of the diffusively reflective circular polarizer film will become:

$$\Delta\lambda = \tau\Delta\lambda_i = \Delta n\, \Sigma p_i.$$

It is indeed a broadband circular polarization. Plus the diffusive performance mentioned above, the CLCP provides a silver white reflection.

Please note that the two-dimensional randomness of the symmetry axes of the cholesteric microchip structure doesn't generate a strong scattering effect as PDLC (Polymer Dispersed Liquid Crystal) does. In the prior art PDLC structure, the size of the microdroplets are, in average, 0.5~2 μm, which strongly scatters the incoming light in a forward direction due to the size of the droplets and the optical anisotropy of the liquid crystal. Please also notice the fact that the two-dimensional randomness of the symmetry axes of the cholesteric microchip structure doesn't generate a strong scattering effect as the cholesteric focal conic texture does in the prior art cholesteric displays, wherein a colorless scattering effect is caused by the completely randomized sub-micro cholesteric domains and the abrupt change of the refractive indices between the border of the cholesteric domains. Accordingly, the present invention provides a novel structure 102, wherein the microchip 103 has a strong backward diffusive reflection and a little forward scattering.

Figure 2:
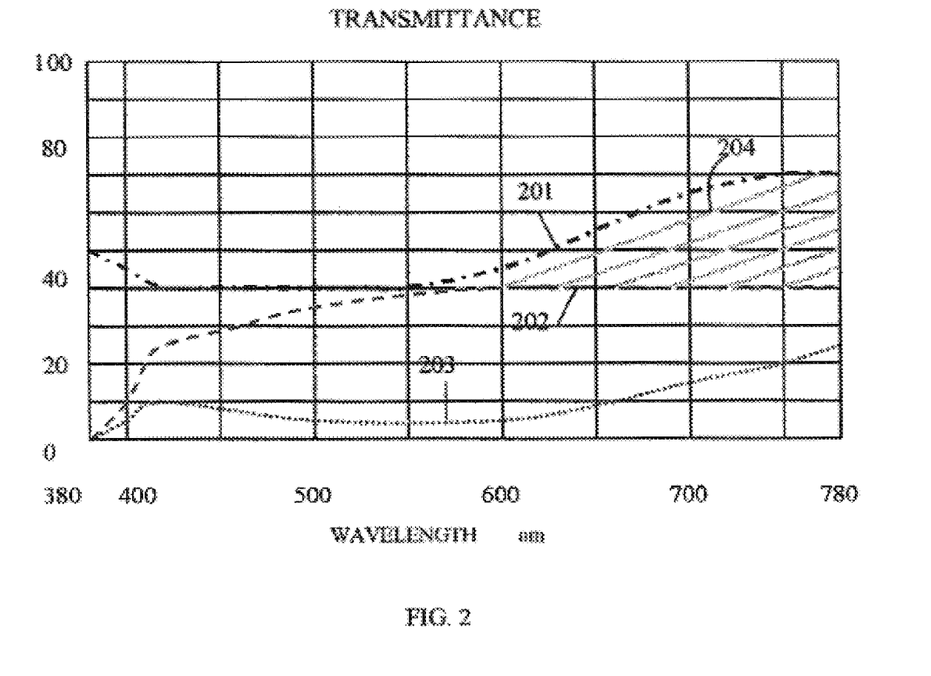
FIG. 2 demonstrates a group of transmission curves of the diffusively reflective circular polarizer tested by a spectrophotometer.

Turning now to FIG. 2, illustrated is a group of transmission curves of the diffusively reflective circular polarizer. A spectrophotometer, TC-1800M, produced by Japan Tokyo Electro-Optic Technology Center, has been used to obtain the following curves. The thickness of the sample film is 24.967 μm, measured by a surface profiler, Surfcom 590A, made in Japan. All the curves in this disclosure are measured in transmissive mode, and yet, the applicant will take more reflective curves which will be disclosed later. The sample tested is designed to reflect left-handed circular polarization. Curve 201 is obtained when a testing sample is vacuum fixed onto the platform, which is vertical to the light beam of the instrument. As a result, the transmission spectrum of the diffusively reflective circular polarizer film over the whole visible wavelengths (380~780 nm) is measured.

From the curve 201, one can realize that, firstly, the bandwidth of the diffusive reflection of the testing sample is basically covering the whole visible light, and secondly, the diffusive reflection causes 8~9% loss of transmission. The base line of the transmittance is 41% while the corresponding specula Bragg reflection sample is 50%. The 8~9% loss of transmission can be explained in the term of haze rate due to the light diffusion. Obviously, a little loss in transmission obtains a big gain of the wide angular reflection. The testing sample takes on a silver white or silk white in the reflection mode and a light milky white transmission in the transmissive mode. The curve 202 is stemming from the same sample but laminated with a right-handed circular polarizer on the top of the diffusively reflective circular polarizer film. The right-handed circular polarizer adopted here is, NRF-EF-HEG, produced by Nitto Denko, Japan. Because the diffusively reflective circular polarizer is left-handed, it will transmit the right-handed circular polarization and the leaking portion of the left-handed circular polarization. The addition of the absorptive right-handed circular polarizer filtrates out the left-handed leaking component and, therefore, makes the curve flat. The curve 203 is stemming from the same sample but with the lamination of a left-handed circular polarizer on the top the diffusively reflective circular polarizer film. The left-handed circular polarizer adopted is, NRF-EF-HEG, produced by Nitto Denko, Japan. Because the diffusively reflective circular polarizer is left-handed, it will transmit the right-handed circular polarization and the leaking portion of the left-handed circular polarization. The addition of the absorptive left-handed circular polarizer filtrates out all the right-handed circular polarization and lets the left-handed leaking component passing through. Thus, the curve reflects the leakage of the diffusively reflective circular polarizer in the transmissive mode. The Delta zone 204 between the curves 201 and 202 demonstrates the red leakage or the imperfection as a full visible spectrum reflective circular polarizer. Fortunately, such leakage problem has been successfully resolved by fine-tuning the mixture of the cholesteric polymer and the conditions of the phase separation process. A curve without the Delta zone 204 or the red leakage will be demonstrated in this disclosure later (see FIG. 4).

One may notice the fact that the reflective mode cholesteric circular polarizer has much higher extinction ratio than that of the transmissive mode. That means the circular polarization generated from the reflection of the polarizer has much higher purity than that of the transmissive mode. The same sample mentioned above was laminated a black adhesive film to the opposite side of the pre-laminated left and right hand polarizers. Then the reflective luminance was measured on the right-handed circular polarizer area (optical dark state) and on the left-handed circular polarizer area (optical bright state) respectively. The contrast ratio of the bright luminance over the dark one is 30:1 in a standard testing environment.

Figure 3:
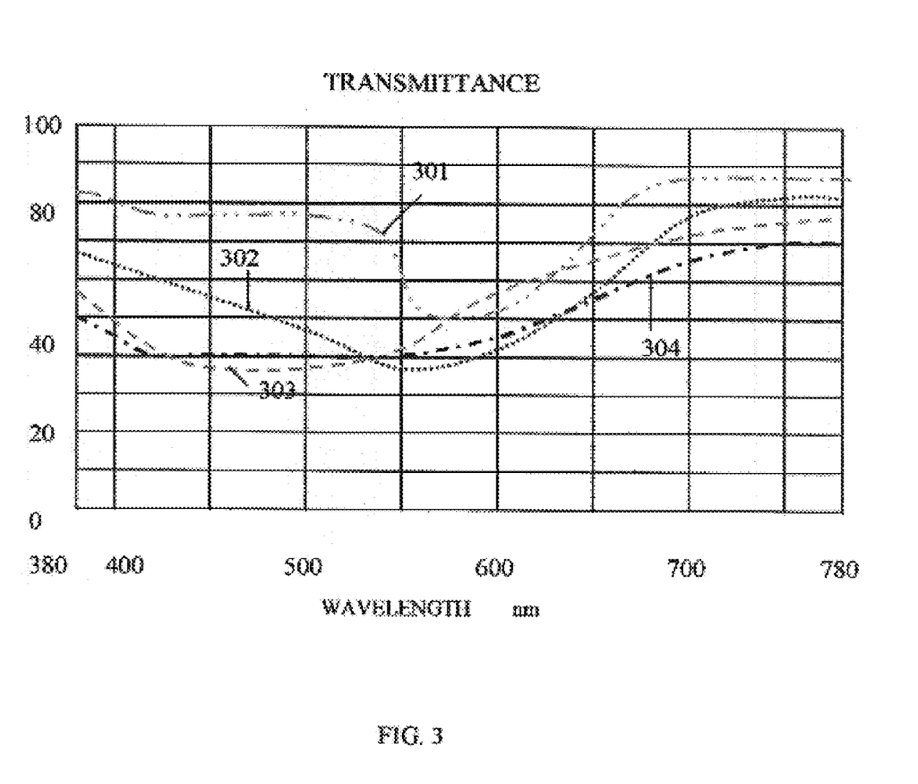
FIG. 3 demonstrates a group of transmission curves of the left-handed diffusively reflective circular polarizer under a different phase separation condition.

Turning now to FIG. 3, illustrated is a group of transmission curves in different stages of the phase separation. A spectrophotometer, TC-1800M, produced by Japan Tokyo Electro-Optic Technology Center, has been used to obtain the curves. The sample tested is designed to reflect left-handed circular polarization. The curve 301 demonstrates the transmissive spectrum of the cholesteric layer before phase separation. In this stage, the layer is sandwiched between two surfaces of the substrates at a predetermined temperature, for example, 85° C. The temperature as well as the surface condition of the layer allows the liquid crystal mixture maintaining in the cholesteric planar texture so that the cholesteric layer takes on a typical narrow band Bragg reflection. Herein the bandwidth of the Bragg reflection is 80 nm. The minimum transmission or the bottom line of the curve is exactly 50% which means that within a narrow band the cholesteric layer reflects 50% left-handed circular polarization and transmits the other 50% right-handed circular polarization. Once the sandwiched film structure is cooled down to the room temperature or even below the room temperature, for example, less than 15° C., the cholesteric planar texture is fixed for a while because of its high systematic viscosity. The narrow band curve 301 will maintain unchanged for approximately 20~30 minus before the phase separation started. The curve 303 demonstrates the transmissive spectrum after the phase separation for 2 hours when the bandwidth of the cholesteric film has been enlarged over 200 nm. The film takes on a bright diffusively wideband reflection with a little greenish. That means the phase separation at this stage has not finished yet, and longer low-temperature duration is necessary. Take the sample at this stage under microscope, one will find that the microchips with different color has already formed and it is dispersed all over the sample, but the size of it is larger than 20 μM. The curve 304 demonstrates the transmissive spectrum after the phase separation for 4 hours, at which the bandwidth of the cholesteric film has broadened over 300 nm. The film takes on a bright silver white or silk white reflection with a large diffusive angle. The phase separation has accomplished at this time. The average size of the microchip is approximately 20 μm. As a matter of fact, more data and curves can be derived to monitor the dynamics of the phase separation process, such as the bandwidth broadening as the function of time lasting, the correlation of microchip's diameter to the cooling temperature and time scale and so on.

It is discovered in the present invention that there exists a phase unification process, which converts the broadband diffusively reflective circular polarizer into the narrow band specula circular polarizer. And more importantly, the phase separation and the phase unification can be inter-changeable, i.e., diffusive broadband ⇔specula narrow band. The curve 302 is the transmissive spectrum during the process of the phase unification. The sample with broadband characteristics (see curve 304) has been stored in the indoor environment for 20 days and is heated again to 85° C. for 2 seconds. A green color appears immediately and, at the same time, the reflective bandwidth is accordingly narrowed down from 300 nm to 150 nm. If the sample stay at the heating plate for a sufficient time period, it will convert to its original specula narrow band Bragg reflection 301. The unified cholesteric planar texture can be, once more, turn to three-dimensional randomized microchip structure through the phase separation. The process is repeatable for unlimited times.

From the polymer science point of view, there are two categories of cholesteric polymer systems: firstly, thermoplastic cholesteric polymer and secondly, thermo-set UV curable cholesteric polymer. The former has relatively smaller molecular weight and $T_g$ point, where the film can be interchangeable between silver white broadband and color narrow band via the transitions of thermo phase separation and phase unification process. This will be used as a special recording or encoding material. Thus, the present invention provides a thermoplastic CLCP polarizer, which is erasable, re-writable, patternable and laser addressable from broadband to narrow band and vice versa.

The latter is a UV curable pre-polymer with pre-determined cross-linking function group. After the phase separation is completed, it can be polymerized into a permanent broadband DRCP film. Therefore, the present invention also provides a thermo-set polymeric broadband polarizer, which can withstand very high temperature, for example, 250° C. for a certain period.

Actually, the UV curable polymer can be also used as an inter-changeable material as long as it avoids contacting with the UV light.

Figure 4:
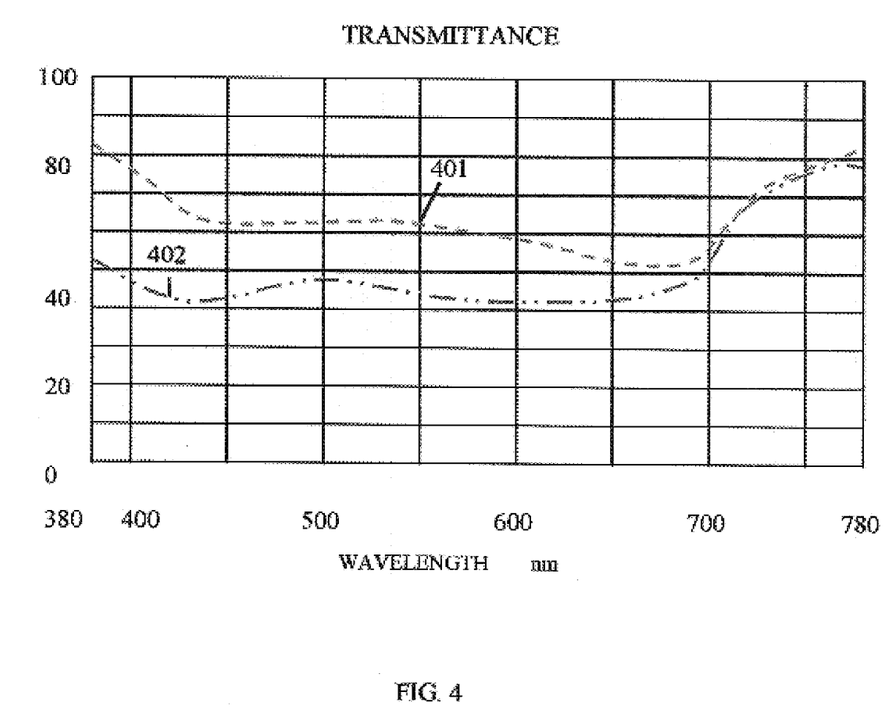
FIG. 4 demonstrates a group of transmission curves of the right-handed diffusively reflective circular polarizer with different coating thickness.

Turning now to FIG. 4, illustrated is a group of transmission curves in the same film sample under the same phase separation condition but with different film thickness. A spectrophotometer, TC-1800M, produced by Japan Tokyo Electro-Optic Technology Center, has been used to obtain the curves. A surface profiler, Surfcom 590A made in Japan, measured the thickness of the sample film. The curve 401 reflects the film area with thickness of 6.4 µm while the curve 402 reflects the area of 20 µm.

What is different between FIG. 4 and FIG. 2 or FIG. 3 is that the diffusively reflective film is designed to reflect right-handed circular polarization. From the curve 402, one can realize that the bandwidth of the diffusive reflection of the testing sample is substantially covering the whole visible light, i.e., from 380 nm to 720 nm. There is no color shift (in some article color shift is called color traveling) over a hemispheric viewing angle. The 20-micrometer film ensures a saturated reflection in the whole visible gamut. The diffusion of the film attributes to the bottom line of the curve 402 below 50% transmission. The curve 401, corresponding to 6.4 µm area, also covers the visible gamut but the reflection is not sufficient.

Figure 5:
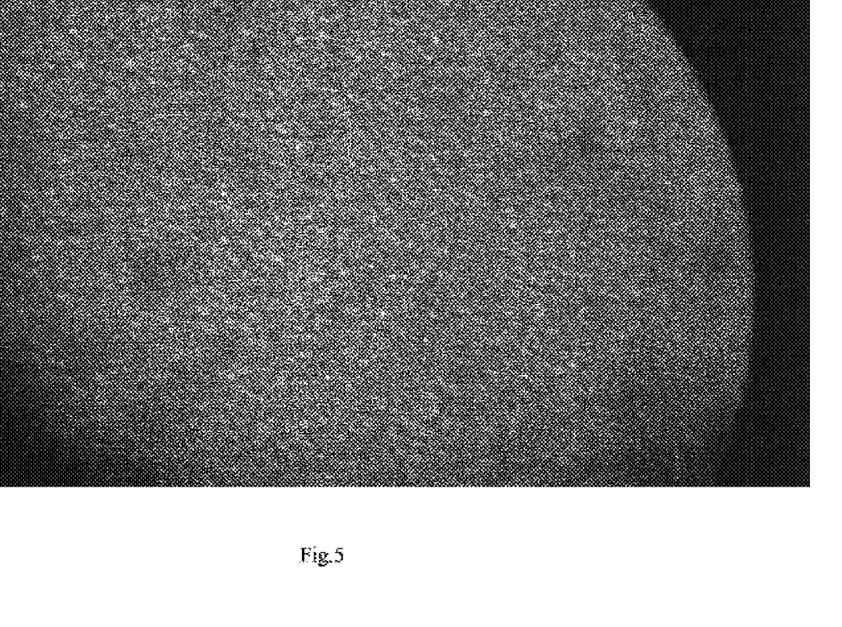
FIG. 5 demonstrates a digital microscopic photo of the left-handed diffusively reflective circular polarizer.

Turning now to FIG. 5, illustrated is a microscopic picture of the diffusively reflective circular polarizer taken by a Bausch & Lomb microscope. One can immediately recognize that the state of the art circular polarizer is of three-dimensional microchip structure, which is fundamentally different from the traditional reflective circular polarizer with only one-dimensional helical pitch gradient along Z direction. The picture demonstrates that the disk shaped red, green and blue microchips are dispersed within the X-Y plane of the film with their diameters ranging from 5 to 20 microns. There are also bright white domains, which reflect the stacked pile of the microchips with variable pitches randomly aligned in the normal direction of the film. It should not be difficult, from the picture then, to draw a conclusion that the new broadband polarizer film is made of micron-sized tiny color chips in a way of three-dimensional randomness as the result of phase separation.

The three-dimensional distribution of the micro color chip makes the novel material a silver-white appearance over an extraordinary wide viewing angle. Unlike the prior art, where the broadband polarizer looks like a mirror, the novel film takes on a bright white color with a superior diffusive reflection.

Thermo phase separation is the radical principle to produce the three-dimensional microchips. At least two polymeric cholesteric liquid crystal materials and/or polymeric nematic liquid crystal material with different solubility or miscibility to each other are required in the phase separation process. Temperature control is the most important dynamic parameter to achieve the phase separation. At relatively high temperature, the mixture is homogenous solution in which the two polymers coexist as a miscible system. Such a solution can be in isotropic phase or cholesteric liquid crystal phase depending on temperature. Applying the solution to the first substrate, such as a plastic film and followed by a lamination with the second substrate while maintaining the temperature in the cholesteric phase, it will turn out a narrow band cholesteric film with a specula color reflection. To induce the phase separation, however, the film needs to be cooled down to the room temperature or even lower, for example, at 15° C. At such a condition, the components of the polymer mixture within the film will no longer be miscible to each other, yet they tend to separate themselves in a form of more stable configuration with lower systematic energy. On the other hand, due to the components are highly viscous system, it is impossible for them to isolate themselves into two pure phases, hence the original cholesteric planar structure is still existing to a certain extent. Generally, the phase separation will last a couple of hours or even longer. When the process is completed, the average helical axis of the microchips is still orientated to the film surface but with a certain degree of fluctuation, which means the helical structure of the microchips have a normal distribution with the maximum reflection along the normal direction. Statistically, a discrete microchip structure with different cholesteric helical pitch will be formed and dispersed uniformly all over the film. Meanwhile, the film's reflection bandwidth is very much enlarged from its original narrow band to the whole visible wavelength as a result of the phase separation. Needless to say, the thermo-caused phase separation process is fundamentally different from the prior art where the phase separation is initiated by UV light, resulting in a specula one-dimensional pitch gradient.

EXAMPLE 1

In order to realize a better phase separation, two liquid crystal polymers are chosen: a crosslinkable cholesteric LC-Silicon CC4039L and a crosslinkable nematic LC polymer SLM90519. Both are from Wacker-Chemie GmbH, Hanns-Seidel-Platz 4, Munchen, Germany. The former is a polysiloxane substituted with mesogenic groups and the latter is polyacrylic LC polymer. The two polymers are mixed at the weight ratio 2:1 at 100° C. heating stage for 5 minutes and then put into a Blue M oven at 115° C. for 3 hours. The homogenous mixture is then applied to the 0.7 mm clean glass substrate, which is positioned on a heating plate at 75° C. A sheet of 7-mil polyester film (OC 50, CP Films Inc. USA) is then laminated on the coated web by a rubber nip laminator. The sandwiched structure is then put onto the heating plate for a while and power is switched off to let the temperature cooling naturally to the room temperature. The following chart records the phase separation process:

| TIME | TEMP.(° C.) | COLOR |
|---|---|---|
| 6:00 pm | 65 | yellowish green |
| 6:07 pm | 44 | red |
| 6:15 pm | 33 | red |
| 6:55 pm | 21 | red |
| 7:20 pm | 21 | red |
| 7:55 pm | 21 | golden yellow |
| 9:00 pm | 21 | silver white |

The phase separation is completed in three hours. The silver white sample is reheating, 10 days later, on a heating plate at 77° C. for 10 minutes. and the color becomes yellowish green again after the phase unification. Such sample is then put onto a glass table at 19.7° C. to carry out the second cycle of phase separation. As a result, the silver white bright reflection, once again, appears within 3 hours. The above-mentioned process can be repeated for many times.

EXAMPLE 2

In this example, the same polymer mixture as the EXAMPLE 1 is adopted except for doping a UV initiator to the mixture for the purpose of achieving a permanent diffusively reflective polarizer film. In this case, a photoinitiator Irgacure 184, a Ciba Geigy product, is added to the two component liquid crystal polymer system with the following ratio:

| CC4039L | 66.3% |
|---|---|
| SLM90519 | 33.3% |
| IG 184 | 0.4% |

The two polymers are mixed at 100° C. heating stage for 15 minutes and then put into a Blue M oven at 115° C. over night to ensure that the photoinitiator is completely dissolved into the system. The homogenous mixture is then applied to the 300 mm×375 mm×0.6 mm glass substrate at 77° C., which is polyimide coated and buffed in a standard LCD production process. A sheet of 5-mil polyester film (Milar, Dupond, USA) is then laminated on the coating web by a rubber nip laminator at a speed of 300 mm/minute. The sandwiched structure is then placed to a flat plate and cooled down to the room temperature for 10 minutes and further to a cooling chamber at 15° C. for 4 hours. Once the phase separation has accomplished, the sandwiched system is positioned on a UV exposing environment at intensity of 2.5 mw/cm² (UV 360 nm) for 5 minutes. The polyester is finally peered off from the laminated structure without any residue of the coated liquid crystal polymer, which means that the UV curing has been carried out completely.

In order to prove the thermo stability of this novel material, the sample is divided into two sections. One section is put into oven at 150° C. for 4 hours while the other part is kept at room temperature as the control sample. Then the two sections are put together and being checked under microscope. It demonstrates that the silver white diffusively circular polarizer film has been crosslinked by UV light and becomes a thermo-set LC polymeric film. Thus, the broadband microchip structure of the film is permanently fixed.

So far the crosslinked diffusively reflective circular polarizer film has gone through a variety of high temperature processes in the production scale. For example, polyacrylate over-coat curing at 220° C. for one hour, polyimide coating and curing at 250° C. for 30 min. and ITO film (Indium Tin Oxide) deposition at 200° C. in vacuum for 20 min., etc.

EXAMPLE 3

The diffusively reflective circular polarizer films introduced in EXAMPLE 1 and EXAMPLE 2 are in the category of the left-handed circular polarizer. In this example, the right-handed diffusively reflective circular polarizer is fabricated. The polymer mixture is comprising:
1. crosslinkable cholesteric LC polymer SLM90520
2. crosslinkable nematic LC polymer SLM90519

Both are newly developed low viscosity liquid crystalline materials containing acrylic groups available from Wacker-Chemie GmbH, Germany. A UV initiator, Irgacure 819 from Ciba Geigy, is also added to the mixture aimed for achieving a permanent diffusively reflective polarizer. The actual formula is listed as follows:

| SLM90520 | 56.3% |
|---|---|
| SLM90519 | 43.3% |
| Irgacure 819 | 0.6% |

The two polymers are mixed at 100° C. heating stage for 15 minutes and then put into a clean oven at 115° C. for three days to ensure that the photoinitiator is completely dissolved into the system. The homogenous mixture is then applied to the 300 mm×375 mm×0.6 mm glass substrate by a doctor blade coater at the surface temperature 85° C. A sheet of 5-mil polyester film (Milar, Dupont, USA) is then laminated on the coating web by a rubber nip laminator at a speed of 300 mm/minute. The sandwiched structure is then placed to a flat plate and cooled down in the clean room environment at 20° C. for 4 hours. Once the phase separation has accomplished, the sandwiched system is positioned on a medium-pressure UV exposing machine at intensity of 2.5 mw/cm² (UV 360 nm) for 5 minutes. The polyester is finally peered off from the laminated structure without any residue of the coated liquid crystal polymer.

As a result, a crosslinked right-handed broadband DRCP film has been invented.

I claim:
1. A method of fabricating a diffusively reflective polarizer comprising the step of:
   a. forming a substantially homogenous mixture of the first polymeric liquid crystal and the second polymeric liquid crystal at a sufficiently high temperature, b. applying the mixture onto at least one substrate with a predetermined surface condition to form a layer with a predetermined thickness while maintaining the mixture at mesomorphic phase,
c. forming a film with a specula narrow band Bragg reflection,
d. cooling the film to the room temperature at a predetermined speed,
e. maintaining a sufficiently low temperature for a controllable duration to let the first polymeric liquid crystal and the second polymeric liquid crystal partially separated into a plurality of discrete microchips, wherein the microchips having a plurality of reflection wavelengths are dispersed at least two dimensionally in the cholesteric film as a result of the thermo phase separation of the polymeric liquid crystals;

whereby a broadband diffusively reflective polarizer is formed.

2. The method of fabricating a diffusively reflective polarizer as in claim 1 wherein the layer with predetermined thickness has the thickness in the range of 5~40 μm.

3. The method of fabricating a diffusively reflective polarizer as in claim 1 wherein the sufficiently low temperature is in the range of −30~30° C.

4. The method of fabricating a diffusively reflective polarizer as in claim 1 wherein the controllable duration is in the range of 1~24 hours.

5. The method of fabricating a diffusively reflective polarizer as in claim 1 wherein the homogenous mixture is also including a UV initiator.

6. The method of fabricating a diffusively reflective polarizer as in claim 1 further including a UV-beam exposure step to make the polarizer high-temperature stable.

7. The method of fabricating a difusively reflective polarizer as in claim 1 wherein the first polymeric liquid crystal and the second polymeric liquid crystal have different mesomorphic structure.

8. The method of fabricating a difusively reflective polarizer as in claim 1 wherein the first polymeric liquid crystal and the second polymeric liquid crystal have diferent physic-chemical miscibility.

9. The method of fabricating a difusively reflective polarizer as in claim 1 wherein the cholesteric film is a thermoplastic polymer.

10. The method of fabricating a difusively reflective polarizer as in claim 1 wherein the cholesteric film is a UV cureable thermo-set polymer.

11. The method of fabricating a difusively reflective polarizer as in claim 1 wherein the discrete microchip is a composite structure of polymeric liquid crystals with different proportion.

12. The method of fabricating a difusively reflective polarizer as in claim 1 wherein the discrete microchip has a diameter in the range of 5~30 micrometer.

13. The method of fabricating a difusively reflective polarizer as in claim 1 wherein the discrete microchips have at least two dimensional randomized distributions within the cholesteric film.

14. The method of fabricating a diffusively reflective polarizer as in claim 1 wherein the phase separation is a thermo phase separation.

15. The method of fabricating a diffusively reflective polarizer as in claim 1 wherein the broadband difusively reflective polarizer reflects a circular polarization covering substantially the visible bandwidth.

16. The method of fabricating a difusively reflective polarizer as in claim 1 wherein the broadband diffusively reflective polarizer reflects a circular polarization covering at least a portion of the invisible bandwidth.

17. The method of fabricating a difusively reflective polarizer as in claim 1 wherein the narrow band Bragg reflection and the broadband diffusive reflection is interconvertible.

18. The method of fabricating a difusively reflective polarizer as in claim 17 wherein the conversion from broadband to narrow band is through the phase unification process.

* * * * *